United States Patent Office 3,452,716
Patented July 1, 1969

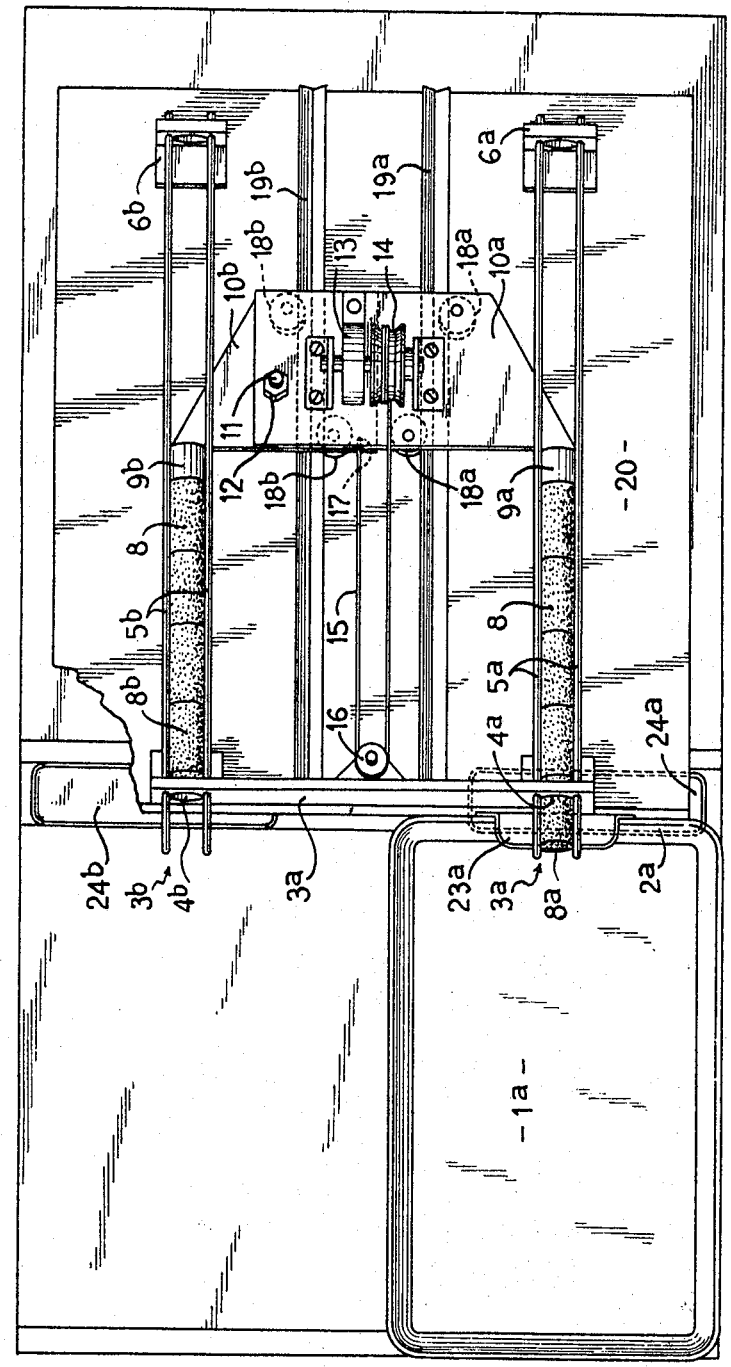

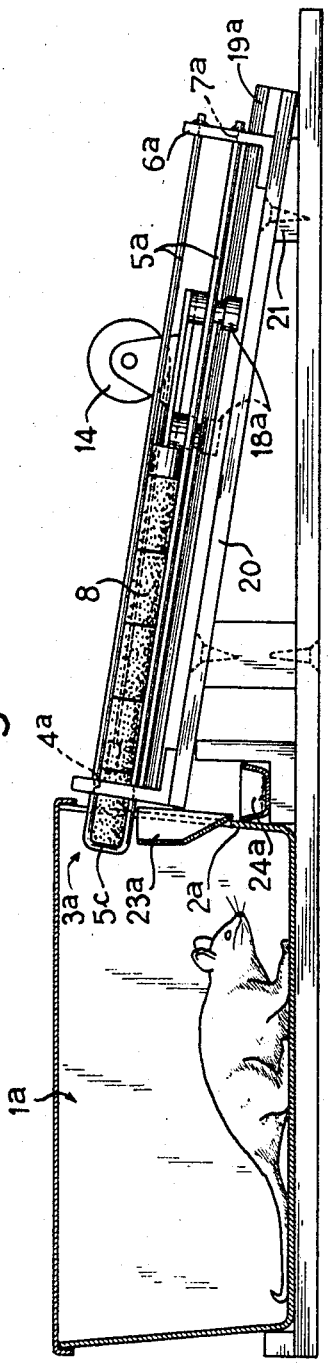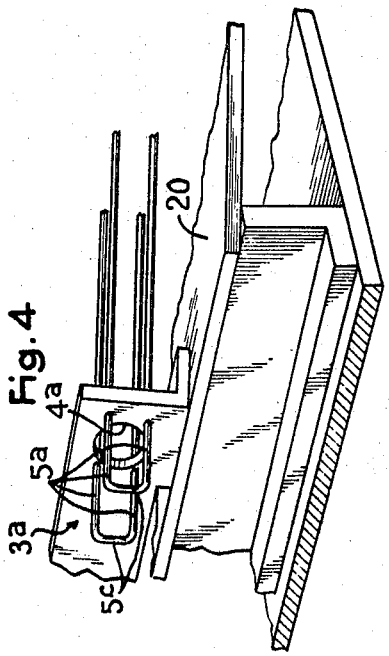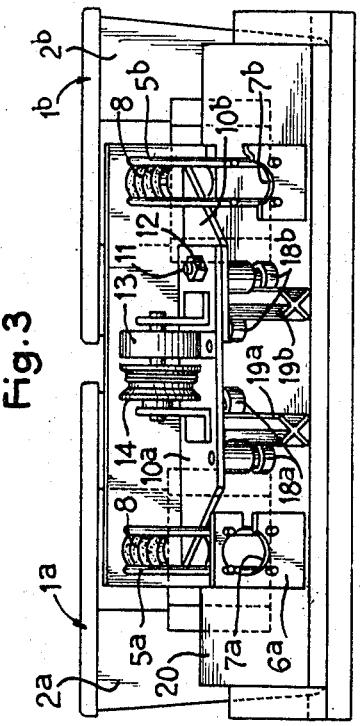

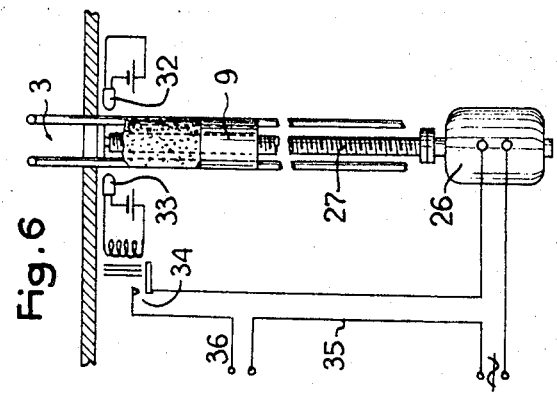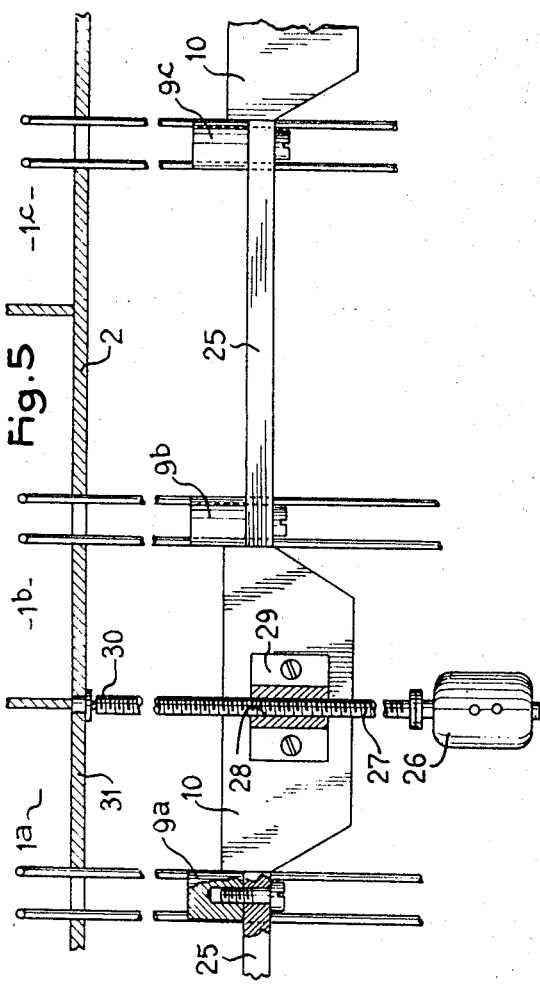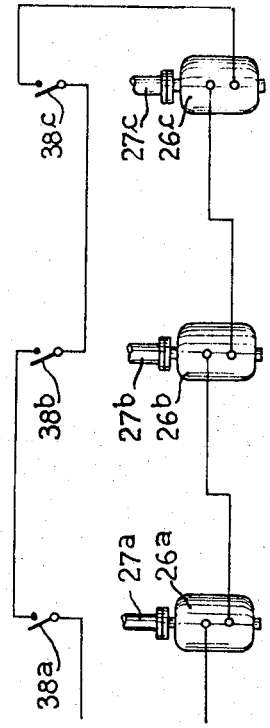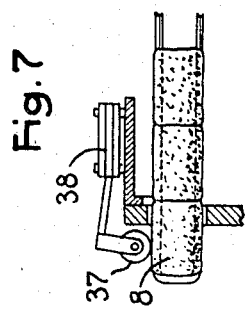

3,452,716
APPARATUS FOR THE EQUIVALENT AND
SYNCHRONOUS FEEDING OF ANIMALS
Robert Molimard, Chevilly-Larue, France, assignor to Laboratories Jacques Logeais, Societe Anonyme, a French body corporate
Filed May 23, 1967, Ser. No. 640,660
Claims priority, application France, May 27, 1966, 63,220
Int. Cl. A01k 5/02; B65h 1/12
U.S. Cl. 119—56                                    16 Claims

ABSTRACT OF THE DISCLOSURE

An apparatus comprising at least two food containers disposed in two separate compartments, devices, distributing aliments arranged in such manner that each food container can only be provided with aliments if all the other containers must also be provided with aliments whereby a practically identical feeding of the animals is achieved as concerns quantity and rhythm (equivalent and synchronous feeding).

---

The present invention, in the making of which Mr. R. Molimard participated, relates to apparatuses for feeding animals and in particular laboratory animals.

The object of the invention is to provide such an apparatus which satisfies the two following conditions:

It must permit the simultaneous feeding of at least two animals.

It must ensure that these animals receive the same amount of food and consume it at a practically identical rhythm (equivalent and synchronous feeding), this amount and rhythm being determined by the animal which consumes the least.

These conditions are particularly important in pharmacological and dietetic experiments spread over a rather long period of time during which the animals undergo various treatments, since it is necessary to limit, and if possible eliminate, deviations in the results which are related to differences in the food consumed by the animals.

For this purpose, the invention provides an apparatus for the equivalent and synchronous feeding of at least two animals which comprises at least two separate compartments each of which is provided with a food container, a device for distributing aliments associated with each food container, and means for rendering all of said distributing devices inoperative so long as one of the food containers remains provided with aliments.

This apparatus therefore ensures that the various animals consume the same overall amount of aliments at roughly the same rhythm, this amount and this rhythm being determined by that one of the animals which at a given moment or throughout the experiment consumes the least.

It must be understood that the apparatus is arranged so that the animals can reach only the aliments placed in the food container.

Further features and advantages of the invention will be apparent from the ensuing description with reference to the accompanying drawings.

In the drawings:

FIG. 1 is a plan view, with parts cut away, of one embodiment of an apparatus according to the invention;

FIG. 2 is a partial elevational view and partial sectional view of the apparatus shown in FIG. 1;

FIG. 3 is an end elevational view of the apparatus shown in FIGS. 1 and 2;

FIG. 4 is a perspective view showing the end of the apparatus forming a food container in detail;

FIG. 5 is a partial plan view of a modification of the distributing device;

FIG. 6 is a partial plan view of a modification of a device for detecting the aliments contained in a food container;

FIG. 7 is a partial side sectional view of a modification of such a detecting device; and FIG. 8 is a diagram showing a possible assembly of the distributing devices of an apparatus according to the invention associated with the detecting device shown in FIG. 7.

FIGS. 1–4 show a first embodiment of an apparatus according to the invention for the equivalent and synchronous feeding of two animals, in the present instance two rats, placed respectively in the compartments $1^a$ and $1^b$.

Disposed in the walls $2^a$, $2^b$ of these compartments are food containers $3^a$, $3^b$ constituted by apertures $4^a$, $4^b$ formed in these walls and by the ends of four guide bars $5^a$, $5^b$ which are connected in pairs so as to form grids $5^c$, $5^d$.

The bars $5^a$, $5^b$ also constitute a storage enclosure for the aliments and are fixed at the end thereof remote from the compartments to plates $6^a$, $6^b$ provided with charging apertures $7^a$, $7^b$.

Disposed between the guide bars are aliments 8 which are in the form of cylindrical biscuits or contained in cardboard tubes the biscuits or tubes constituting rigid doses having a diameter slightly greater than the distance between two adjacent guide bars.

A mechanism for feeding the aliments to the compartments $1^a$, $1^b$ comprises pistons $9^a$, $9^b$ which form plungers and are connected to plates $10^a$, $10^b$. These plates are normally interconnected by a bolt 11 and a nut 12 or any other suitable means.

This mechanism further comprises a spiral spring 13 which actuates a winch 14 around which a cable 15 is wound. The latter passes around a pulley 16 and is hooked at 17 to the plate $10^b$.

The support plates $10^a$ and $10^b$ are supported by rolling bearings $18^a$, $18^b$ on X-section guide rails $19^a$, $19^b$.

The assembly of the distributing device is fixed on a plate 20 which is held inclined by wedge-shaped blocks 21, 22 (FIG. 2).

Provided under each food container is a crumb collector $23^a$, $23^b$ which communicates with a recovery tray $24^a$, $24^b$.

The operation of this apparatus will be described with reference to FIGS. 1–4.

With an animal placed in each compartment $1^a$, $1^b$ and assuming that the doses 8 are placed between the bars $5^a$ and $5^b$, the spiral spring 13 tends to cause these doses to advance towards the compartments in acting by way of the winch 14, the cable 15 and the pistons $9^a$ and $9^b$ while the rolling bearings $18^a$, $18^b$ roll along the rails $19^a$, $19^b$. However, owing to the fact that the diameter of these doses exceeds the distance between bars, it is sufficient that a biscuit of one of the rows of doses abut the corresponding grid 5 or $5^d$ for the whole of the movable unit to be blocked or rendered inoperative. This situation is illustrated in the embodiment shown in FIG. 1 in which the dose $8^a$ is supplied to the food container $3^a$ whereas the dose $8^b$ remains outside the compartment $1^b$ since the thrust mechanism has been blocked by the abutment of the biscuit or tube $8^a$ against the grid $5^c$.

It will be understood that at the start of the experiment the same number of biscuits is introduced in each distributing device and that the situation just described only occurs in the course of the experiment.

Thus it can be seen that the distribution of the aliments in the respective food container of each compartment only occurs when both food containers must be provided with aliments. In this way, at any moment in the experiment, the maximum difference between the amounts of food consumed by the two animals cannot exceed one dose. Further, the crumbs collector 23$^a$, 23$^b$ and the trays 24$^a$, 24$^b$ make it possible to determine the exact amount of food actually consumed by each animal.

According to another embodiment shown in FIG. 5, the mechanism for feeding the aliments to the compartments 1$^a$, 1$^b$, 1$^c$ . . . comprises pistons 9$^a$, 9$^b$, 9$^c$ . . . which are integral with plates 10 and stays 25. The assembly is actuated by at least one electric motor 26 which drives a lead-screw 27. The latter co-operates with a screwthread 28 formed in a member 29 secured to the plate 10. The end 30 of the lead-screw is rotatably mounted in a fixed member 31 which can be the wall 2 of the compartments containing the animals.

The operation of this device is of course identical to that of the first embodiment, the motor 26 being blocked or rendered inoperative when the torque for overcoming the resistance to the feeding of the aliments is excessive. This is the situation when one of the biscuits abuts the grid of the corresponding food container.

FIG. 6 shows another actuating mechanism associaed with a detecting and control device which is substituted for the simple mechanical abutment employed in the foregoing embodiments. This assembly relates to one food container and distributing device. It will be understood that similar mechanisms equip each feeding station and are connected in series.

The device shown in FIG. 6 is, like the device shown in FIG. 5, equipped with an electric motor 26 driving a lead-screw 27 which co-operates with a screwthreaded member (not shown) integral with the piston 9. Placed at the entrance of the food container 3 is a detecting device consisting of a source of light 32, a photo-sensitive cell 33 which actuates, when it receives the light, a contact 34 inserted in a conductor 35 feeding the motor. Similar devices of the other feeding stations can be connected in series to the terminals 36.

The operation of this device is simple.

When a biscuit or other appropriate aliment is located in the food container 3 in the path of the beam of light emitted by the source 32 the contact 34 is open and the motor 26 is not fed. On the other hand, as soon as the beam of light reaches the cell 33, the contact 34 is closed and the motor 26 is fed, on condition of course that the contacts of the other feeding stations are also closed.

FIG. 7 shows a mechanical modification of the device detecting the aliments in the food container. This device comprises a sensing element 37 connected to a contact 38. So long as the sensing element is maintained in the illustrated upper position, the contact 38 is open and the corresponding electric motor is not fed. As soon as the biscuit 8 disappears, the sensing element descends and closes the contact 38 so that the motor is fed.

For a plurality of feeding stations, the assembly is that shown in the diagram of FIG. 8 in which the motors 26$^a$, 26$^b$, 26$^c$ . . . are connected in series and in series with the corresponding contacts 38$^a$, 38$^b$, 38$^c$ . . . , the motors only being fed if all the contacts are closed, that is, if all the food containers are empty.

It will be understood that many modifications are possible, in particular as concerns the distributing devices for supplying the aliments to the food containers. Indeed, it is possible to employ a driving means which is separate for each feeding station or a single driving means. This driving means can be an electric motor or a spiral spring as mentioned hereinbefore. Alternatively, it can be a "Sandow" type elastically yieldable device or a device employing the potential energy of a weight which acts through a pulley. It is also possible to employ synchronized conveyor belts instead of the foregoing devices, which are all of the type having a plunger.

It has also be seen that several means can be contemplated for stopping or actuating the distributing devices in a synchronized manner by means of a simple abutment or with the aid of detecting and control devices.

If it is desired at a given moment of the experiment to modify the feeding of one of the animals, it is possible to disconnect the corresponding distributing device from the assembly.

It is possible, as in the previously-described manner of proceeding, to employ such an apparatus for laboratory experiments, but it can also be employed in the raising of domestic animals.

Although specific embodiments of the invention have been described, many modifications and changes may be made therein without departing from the scope of the invention.

Having now described my invention what I claim as new and desire to secure by Letters Patent is:

1. An apparatus for the equivalent and synchronous feeding of at least two animals, said apparatus comprising a plurality of separate compartments each of which is adapted to receive one animal, each compartment having a food container, a distributing device associated with each food container for distributing aliments therein, and means for rendering all of said distributing devices inoperative so long as one of said food containers remains provided with aliments.

2. An apparatus as claimed in claim 1, wherein said distributing device comprises means for guiding the aliments to the food container, a plunger movable in said guide means towards the corresponding food container and a driving device for shifting said plunger towards said food container.

3. An apparatus as claimed in claim 2, wherein said guide means comprise bars which define a passageway and extend into the corresponding compartment, transversely extending elements interconnecting the ends of said bars in said compartment and constituting a grid, the distance between the bars and between the grid elements being smaller than the transverse size of said aliments, said aliments being in a form suitable for being fed along said bars into said food compartment by said plunger.

4. An apparatus as claimed in claim 1, wherein said aliments are in the form of rigid doses, the ingredients of which are agglomerated.

5. An apparatus as claimed in claim 1, wherein said aliments are enclosed in rigid and destructible wrappings.

6. An apparatus as claimed in claim 2, wherein a common driving device actuates at least two plungers which are interconnected by a stay.

7. An apparatus as claimed in claim 2, wherein a separate driving device is provided for each plunger.

8. An apparatus as claimed in claim 6, wherein two adjacent plungers are each integral with a plate carrying rolling bearings in contact with at least one guide rail, said plates being interconnected by fixing means so as to constitute said stay.

9. An apparatus as claimed in claim 8, wherein said driving device is connected to shift both plungers and is mounted on said stay and comprises a spiral spring, a winch having a spindle rotatably mounted on said stay, a cable having one end connected to said winch and the other end connected to said stay, a pulley held stationary relative to said compartments, said cable extending around said pulley, said spiral spring having an inner end fixed to said spindle and an outer end fixed to said stay, whereby shifting said plungers away from said food container winds up said spiral spring so that said spiral spring drives said plungers towards said compartments.

10. An apparatus as claimed in claim 2, wherein said driving device comprises a fixed electric motor, a lead screw connected to said motor to be driven thereby, a screwthreaded member integral with said plunger and screwthreadedly engaged on said lead-screw so as to be shifted by the lead-screw towards said food container.

11. An apparatus as claimed in claim 3, wherein said means for rendering all the distributing devices inoperative so long as one of the food containers contains aliments comprise said grid against which the aliments abut.

12. An apparatus as claimed in claim 2, wherein the driving device is an electric motor and said means comprise a detecting and control device which is associated with each food container and is capable of detecting the presence of aliments in said food container.

13. An apparatus as claimed in claim 12, wherein each detecting device comprises a source emitting a beam of light across the corresponding food container, a photo-sensitive cell located in the path of said beam of light on the other side of the food container relative to the source, and a relay controlled by said cell and arranged to be energized when said cell receives the beam of light so as to close a contact in the feed circuit of the motor.

14. An apparatus as claimed in claim 12, wherein each detecting device comprises a sensing element and a contact which is associated with to be actuated by said element and is placed in the feed circuit of the electric motor, said sensing element and said contact being so arranged that the sensing element closes the contact when the corresponding food container is empty.

15. An apparatus as claimed in claim 13, wherein the detecting and control devices corresponding to the various food containers are connected in series in the feed circuit of the motor.

16. An apparatus as claimed in claim 1, comprising a crumb collector under each food container, which collector communicates with a recovery tray.

References Cited

UNITED STATES PATENTS

| | | | |
|---|---|---|---|
| 2,585,371 | 2/1952 | Coffing | 119—51.13 X |
| 2,766,906 | 10/1956 | Bookout et al. | 221—92 |
| 2,979,229 | 4/1961 | Reeder et al. | 221—22 |
| 3,030,483 | 4/1962 | Rudolph et al. | 221—92 X |
| 3,298,565 | 1/1967 | Cease | 221—13 |
| 3,302,828 | 2/1967 | Gomez et al. | 221—129 |
| 3,340,851 | 9/1967 | Frank et al. | 119—56 X |
| 3,371,821 | 3/1968 | Abood et al. | 221—93 |

ALDRICH F. MEDBERY, *Primary Examiner.*

U.S. Cl. X.R.

119—51.13; 221—129